Figure 5:
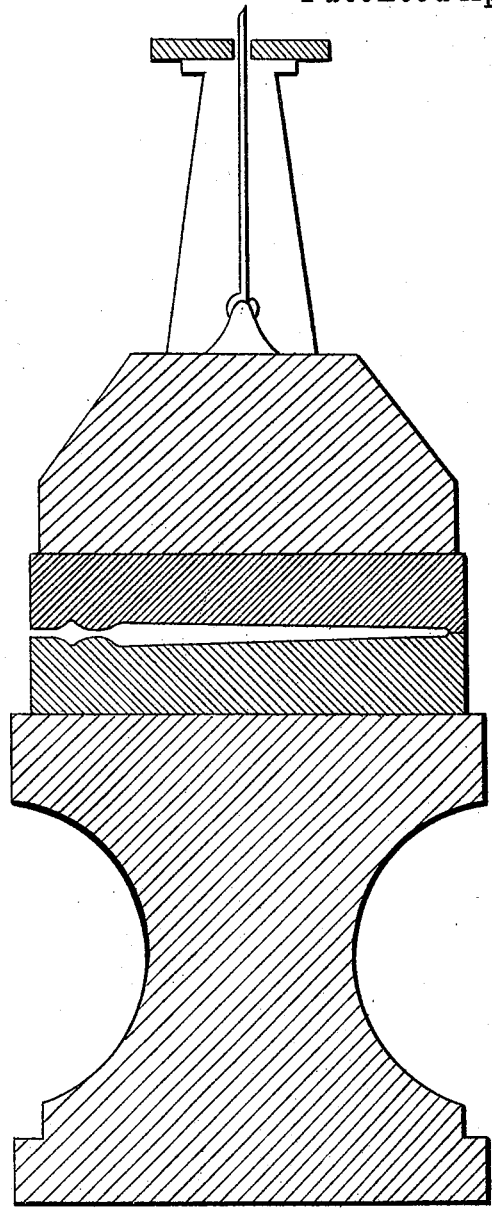

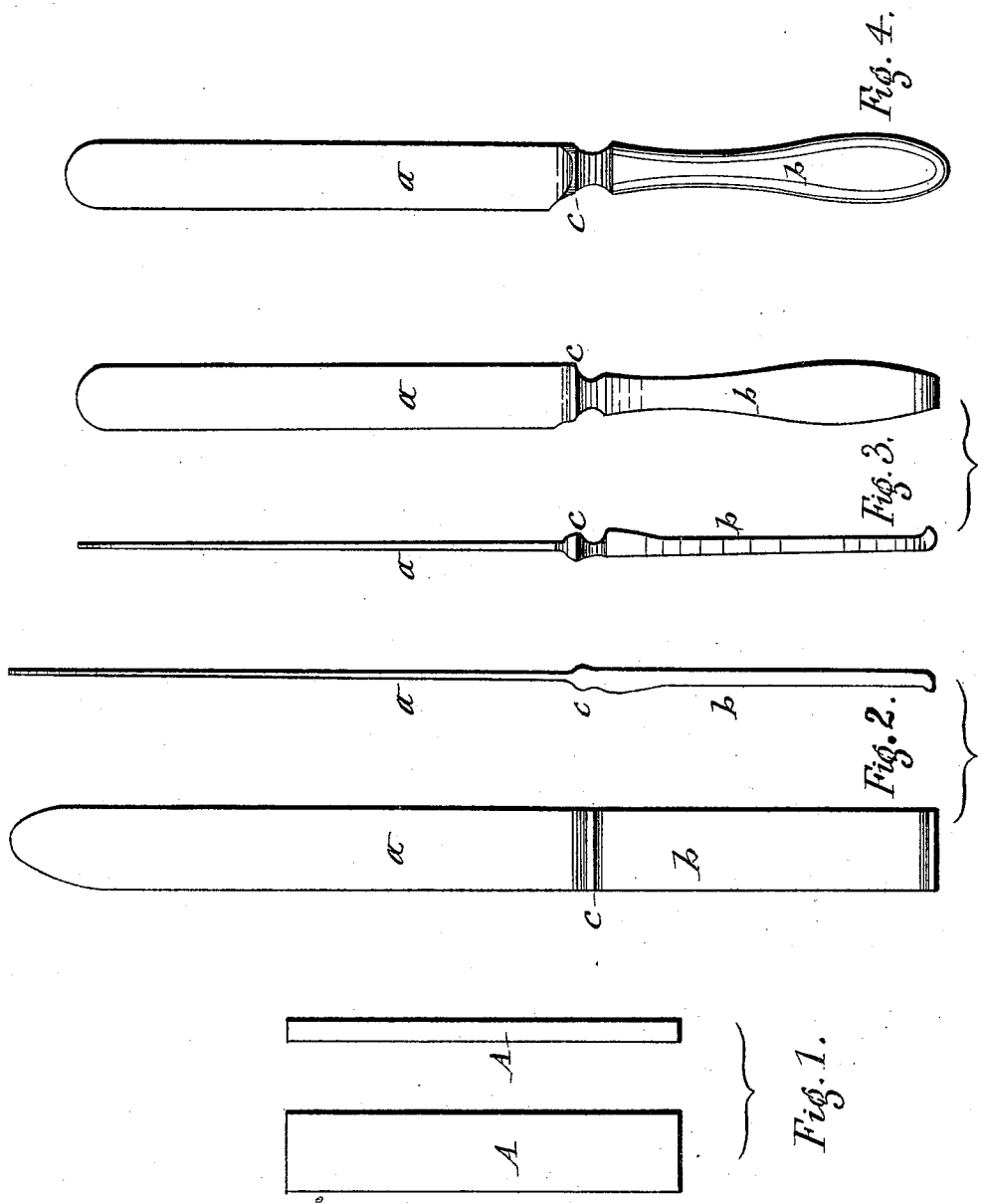

(No Model.) 2 Sheets—Sheet 2.

L. F. DUNN.
MANUFACTURE OF TABLE CUTLERY.

No. 361,620. Patented Apr. 19, 1887.

WITNESSES: INVENTOR:

UNITED STATES PATENT OFFICE.

LEONARD F. DUNN, OF COMMUNITY, NEW YORK.

MANUFACTURE OF TABLE-CUTLERY.

SPECIFICATION forming part of Letters Patent No. 361,620, dated April 19, 1887.

Application filed November 26, 1886. Serial No. 219,998. (No model.)

*To all whom it may concern:*

Be it known that I, LEONARD F. DUNN, of Community, in the county of Madison, in the State of New York, have invented new and useful Improvements in Manufacture of Table-Cutlery, of which the following, taken in connection with the accompanying drawings, is a full, clear, and exact description.

My present invention consists, essentially, in certain modifications and addition of important steps to the process of manufacturing table-ware described in my Patent No. 280,918, dated July 10, 1883, said additional steps being required in the manufacture of knives and analogous edged articles, as hereinafter explained, and summed up in the claim.

In the accompanying drawings, Figure 1 shows plan and edge views of the blank from which the knife is formed. Fig. 2 shows plan and edge views of the blank after it has passed through the second step of the process. Fig. 3 is a plan and an edge view showing the condition of the blank after the third step of the process. Fig. 4 is a plan view of the completed knife, and Fig. 5 is a vertical section of a drop-press adapted for forming the handle on the knife.

At the present state of the art, steel table-knives with handles integral therewith are manufactured by forming the handle and blade of the knife in one piece from a suitable bar of steel by heating and softening the bar, and while hot pressing or rolling a portion thereof into approximate blade shape, stamping the remaining portion of the bar while hot into the shape of the handle, then again reheating the blade and imparting to it the required varying thickness under a trip-hammer, then trimming the blade, then hardening and tempering the same, and finally grinding and finishing it to its proper shape. This method of forging the knife from steel has proved very slow and expensive, owing to the greatly varying thickness of the handle and blade, requiring frequent reheating and annealing to reduce the blade to its required shape.

Attempts have been made to cold-roll the steel after it has been annealed; but it has been found that in attempting to introduce the steel between the rolls the former offers so much resistance to the action of the latter as to cause the steel to slip and fly from the rolls.

To avoid the expense of forging table-knives, resort has been had to cutting or stamping out the blades from sheet-steel and applying handles of some other material, as wood, bone, and various inferior metals; but articles of such a nature cannot at present find a ready market.

The object of my present invention is to produce in a comparatively inexpensive and expeditious manner steel table-knives having the blade and handle formed in one piece; and to that end my invention consists, essentially, in forming the knife-blanks from soft stock, such as wrought or ingot iron or homogeneous steel, as free from carbon as possible, in order to allow the blanks to be annealed soft enough to admit of cold-rolling them to advantage, which blank I treat in the manner hereinafter explained, and specifically set forth in the claim.

In carrying out my invention I proceed as follows: I cut transversely from a bar of wrought or ingot iron or homogeneous steel, preferably of rectangular form in cross-section, a blank, A, as shown in Fig. 1 of the drawings, of the requisite length to produce the blade and handle in one piece, said bar being previously cleaned by a scratch-brush or other suitable means to save the extra time and labor of cleaning the blanks individually. This blank I anneal, and then pass it cold between graded rolls, which distend the blank and impart to it the varying thicknesses required at the blade $a$, handle $b$, and intervening bolster $c$, as represented in Fig. 2 of the drawings. I then trim the edges of this approximately-shaped blank to the required contour, as shown in Fig. 3, and subsequently introduce it, together with either charcoal or cyanide of potassium, or both, into an air-tight muffle, and place said muffle in an oven, wherein I subject it to sufficient heat to either partly or wholly carbonize the blank, which, by the aid of the cyanide, is effected so rapidly as to obviate warping or distorting the blank. At the same time the requisite tenacity and elasticity is imparted to the blank, and the blank receives a surface which is less liable to corrode than that of iron or soft steel, and is yet sufficiently soft and in proper condition to receive the necessary subsequent pressure of the dies and rollers by which the handle and blade receive their final shape. After the blank has been carbonized or partly carbonized in the manner aforesaid, I thoroughly clean the surfaces thereof, and then press the handle and bolster of the blank into its final shape by means of a drop-press fitted with suitable dies, as represented in Fig. 5 of the drawings, and afterward shape the blade to give it the usual thickness at the back and the bevels toward the cutting-edge. This shaping of the blade may be accomplished either by the pressure of suitable dies or by cross-rolling the blade between rolls graded to impart the varying thickness thereto; or the blade may be beveled to an edge during the first rolling operation of the blank and before the edges of the rolled blank are trimmed, as heretofore described. The blank having thus received its final shape, I then grind and polish it by any suitable and well known appliances.

This knife I carbonize and harden or temper either before or after grinding and polishing it, though preferably before the latter operation, and by carbonizing it in a hermetically-sealed heated muffle containing charcoal and cyanide of potassium or other substance capable of absorbing oxygen and imparting carbon, and after the knife has been properly carbonized removing the muffle from the heating oven or furnace and carefully opening the muffle and quickly plunging the knife into water or any suitable liquid for hardening steel.

It is evident that I may so regulate the process of carbonizing and hardening as to impart the requisite elasticity and temper for a table-knife; but in practice I prefer to carbonize and harden the knife to a greater degree than is required and subsequently draw the temper to the proper degree. Should the knife spring out of shape during the process of hardening, I straighten the same while heated to draw the temper, as in this state the knife is very limber and yields readily to the force required to straighten it.

A knife manufactured in the manner hereinbefore described is in excellent condition to receive a plating of silver or other metal.

Having described my invention, what I claim as new, and desire to secure by Letters Patent, is—

The process of manufacturing knives from wrought or ingot iron or homogeneous steel, consisting, essentially, in forming the blank from said material, annealing said blank, then cold-rolling the same to approximate shape, then pressing the handle and blade into their requisite shape, then grinding and polishing the knife, and carbonizing and tempering the same at the proper stage of the process, substantially as set forth.

In testimony whereof I have hereunto signed my name and affixed my seal, in the presence of two attesting witnesses, at Syracuse, in the county of Onondaga, in the State of New York, this 20th day of November, 1886.

LEONARD F. DUNN. [L. S.]

Witnesses:
C. BENDIXON,
H. P. DENISON.